(12) United States Patent
Chen et al.

(10) Patent No.: US 7,847,712 B2
(45) Date of Patent: Dec. 7, 2010

(54) ADAPTOR FOR MEMORY CARD

(75) Inventors: Xiao-Zhu Chen, Shenzhen (CN); Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 39 days.

(21) Appl. No.: 12/391,522

(22) Filed: Feb. 24, 2009

(65) Prior Publication Data

US 2010/0178777 A1 Jul. 15, 2010

(30) Foreign Application Priority Data

Jan. 9, 2009 (CN) .................... 2009 1 0300134

(51) Int. Cl.
*H03M 9/00* (2006.01)

(52) U.S. Cl. .................... 341/100; 341/101; 708/105

(58) Field of Classification Search .................. 341/100, 341/101, 137; 708/105; 345/169
See application file for complete search history.

(56) References Cited

U.S. PATENT DOCUMENTS 5,708,840 A * 1/1998 Kikinis et al. ............... 708/105

* cited by examiner

*Primary Examiner*—Jean B Jeanglaude
(74) *Attorney, Agent, or Firm*—D. Austin Bonderer

(57) ABSTRACT

An adaptor for a memory card includes a printed circuit board (PCB) conversion board, a memory card connector, a serial interface connector, a signal convertor, and a parallel interface connector. When a motherboard is connected to the serial interface connector, serial signals output from the motherboard are transmitted to the signal convertor via the serial interface connector. The signal convertor converts the serial signals into parallel signals and transmits the parallel signals to the memory card. When the motherboard is connected to the parallel interface connector, parallel signals output from the motherboard are transmitted to the memory card via the PCB conversion board without any parallel-to-serial signal conversion.

8 Claims, 2 Drawing Sheets

ADAPTOR FOR MEMORY CARD

BACKGROUND

1. Technical Field

The present disclosure relates to adaptors, and particularly to an adaptor for a memory card.

2. Description of the Related Art

A compact flash (CF) card is a popular memory card developed by SanDisk in 1994 that uses flash memory to store data on a very small card. CF cards are capable of functioning as a hard disk in a computer system due to their large capacities. However, CF cards usually do not support a serial connection, thus CF cards, for example, may not be employed in a notebook computer only having a serial connection.

DETAILED DESCRPITION

Figure 1:
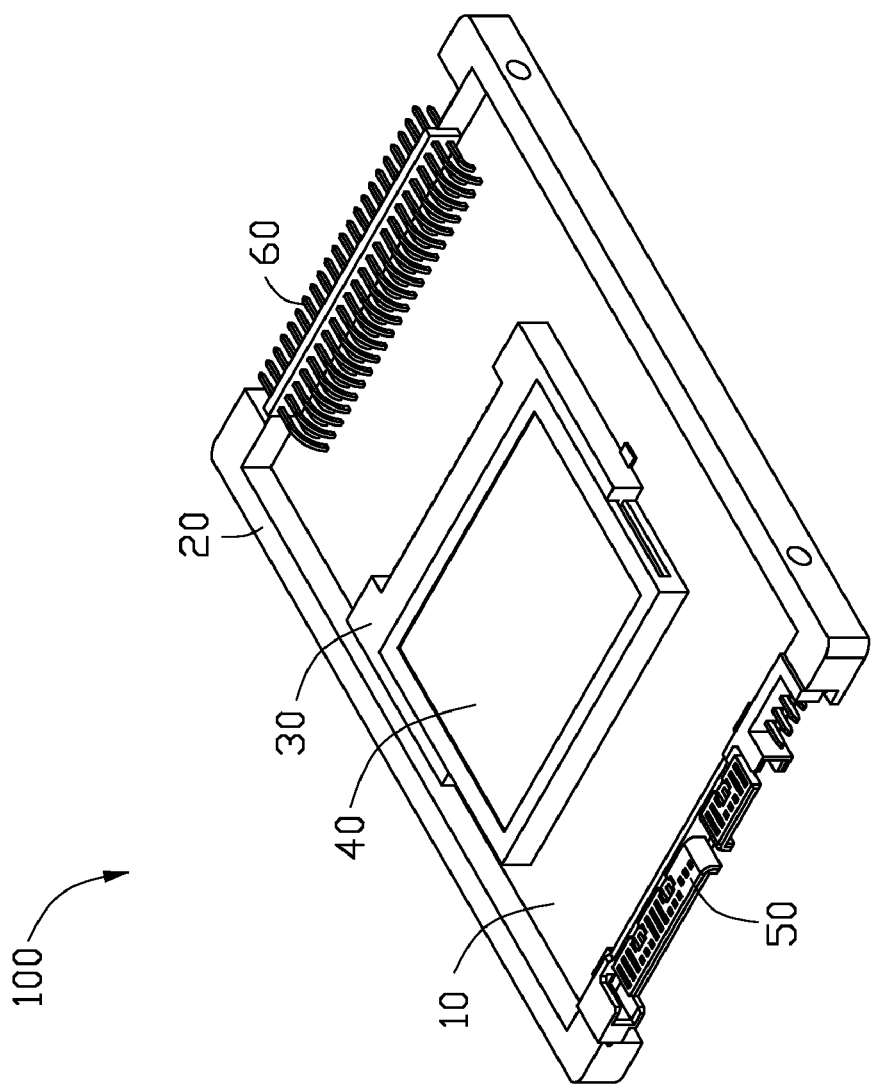
FIG. 1 is a configuration view of an exemplary embodiment of an adaptor for a memory card.
Figure 2:
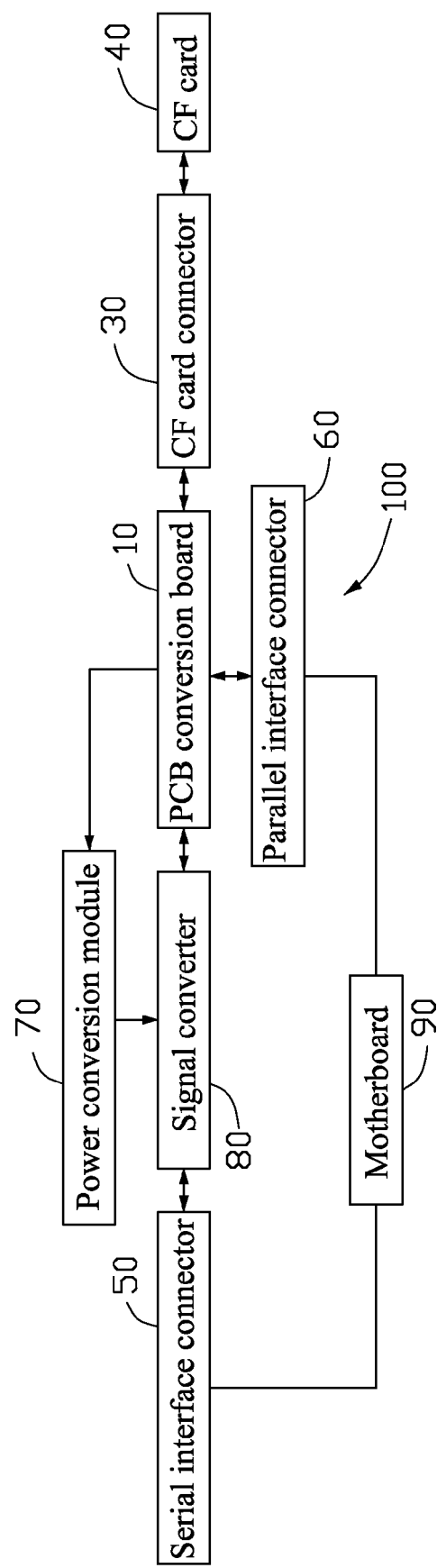
FIG. 2 is a circuit diagram of an exemplary embodiment of the adaptor of FIG. 1.

Referring to FIG. 1 and FIG. 2, an exemplary embodiment of an adaptor 100 for a memory card includes a printed circuit board (PCB) conversion board 10, a bracket 20, a memory card connector, a serial interface connector 50, a parallel interface connector 60, a power conversion module 70, and a signal converter 80. In one exemplary embodiment, the memory card is a compact flash (CF) card 40, and the memory card connector is a CF card connector 30. The adaptor 100 is configured to allow the CF card 40 to selectively connect to either a serial or parallel connection of a motherboard 90. The motherboard 90 may be a motherboard of a computing device, such as a laptop computer or a desktop computer.

The PCB conversion board 10 is rectangularly shaped and is configured for holding components thereon and transferring signals among the components. Two opposite sides of the PCB conversion board 10 are fixed by the bracket 20. The serial interface connector 50 is arranged at one end of the PCB conversion board 10. The parallel interface connector 60 is arranged at an end opposite to the serial interface connector 50 of the PCB conversion board 10. The CF card connector 30 is fixed to the PCB conversion board 10, and configured to connect to the CF card 40. The signal converter 80 and the power conversion module 70 are defined inside the PCB conversion board 10. Further details of the components will be explained below.

The serial interface connector 50 is connected to the signal converter 80. The signal converter 80 is also connected to the PCB conversion board 10, and is configured for converting signals between the serial interface connector 50 and the CF card 40 via the PCB conversion board 10 and the CF card connector 30. The power conversion module 70 is connected to the PCB conversion board 10 and the signal converter 80. The parallel interface connector 60 is connected to the PCB conversion board 10 directly and is only needed in those instances when the motherboard 90 has a parallel connection available. The PCB conversion board 10 is also connected to the CF card 40 via the CF card connector 30.

In one example, the motherboard 90 may only have a serial connection. The serial connection may be connected to the serial interface connector 50 of the adaptor 100. About 5V may be applied to the PCB conversion board 10 via the motherboard 90 in one exemplary embodiment. The power conversion module 70 converts the 5V to voltages of about 1.8V and 3.3V to supply power for the signal converter 80. When the CF card 40 is accessed, serial signals from the motherboard 90 are transmitted to the signal converter 80 via the serial interface connector 50. The signal converter 80 converts the serial signals to parallel signals and transmits the parallel signals to the CF card 40 via the PCB conversion board 10 and the CF card connector 30. Parallel signals from the CF card 40 are transmitted to the signal converter 80 via the CF card connector 30 and the PCB conversion board 10. The signal converter 80 converts the parallel signals to serial signals and transmits the serial signals to the motherboard 90 via the serial interface connector 50, thereby allowing data to be read and/or written to the CF card 40 via the motherboard 90.

In another example, the adaptor 100 may be used with the motherboard 90 having a parallel connection available to connect the CF card to the motherboard 90. In such a case, the parallel interface connector 60 is used to connect to the motherboard 90. Parallel signals are exchanged between the motherboard 90 and the CF card 40 via the parallel interface connector 60, the PCB conversion board 10, and the CF card connector 30 without any parallel-to-serial signal conversion.

In one exemplary embodiment, the bracket 20 may be a 2.5 inch hard disk drive (HDD) type bracket. The signal converter 80 is a Sil3811 type chip in one exemplary embodiment. The serial interface connector 50 is a serial ATA (SATA) connector. The parallel interface connector 60 is an integrated drive electronics (IDE) connector.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An adaptor for a memory card, comprising:
   a printed circuit board (PCB) conversion board;
   a memory card connector connected to the PCB conversion board, and receiving and connecting the memory card to the PCB conversion board;
   a serial interface connector defined on the PCB conversion board, to connect to a motherboard of an electronic device;
   a signal converter connected between the PCB conversion board and the serial interface connector, to convert serial signals output from the motherboard to parallel signals for the memory card or convert parallel signals output from the memory card to serial signals for the motherboard; and
   a parallel interface connector connected to the PCB conversion board, to exchange the parallel signals between the motherboard and the memory card.

2. The adaptor of claim 1, further comprising a power conversion module connected between the PCB conversion board and the signal converter, wherein the power conversion module is configured for converting a voltage of the PCB conversion board to supply power for the signal converter.

3. The adaptor of claim 1, further comprising a bracket to fix two opposite sides of the PCB conversion board.

4. The adaptor of claim 3, wherein the bracket is a 2.5 inch hard disk drive (HDD) type bracket.

5. The adaptor of claim 1, wherein the serial interface connector is a serial ATA connector.

6. The adaptor of claim 1, wherein the parallel interface connector is an integrated drive electronics (IDE) connector.

7. The adaptor of claim 1, wherein the signal convertor is an Si13811 chip.

8. The adaptor of claim 1, wherein the memory card connector is a compact flash card connector.

* * * * *